United States Patent [19]

Utter

[11] Patent Number: 5,366,628

[45] Date of Patent: Nov. 22, 1994

[54] PAINT THINNER RECYCLING TOWER

[76] Inventor: James A. Utter, Rte. 2, Box 77, Bristol, W. Va. 26332

[21] Appl. No.: 22,210

[22] Filed: Feb. 25, 1993

[51] Int. Cl.⁵ .............................................. B01D 21/00
[52] U.S. Cl. .................................. 210/232; 210/519; 210/521; 210/540
[58] Field of Search ............ 210/513, 519, 521, 532.1, 210/538, 540

[56] References Cited

U.S. PATENT DOCUMENTS

| | | | |
|---|---|---|---|
| 411,646 | 9/1889 | Dorn et al. ............................ | 210/519 |
| 449,213 | 3/1891 | Edwards ............................... | 210/579 |
| 493,073 | 3/1893 | Darragh ............................... | 210/513 |
| 513,787 | 1/1894 | Hogan .................................. | 210/513 |
| 568,145 | 9/1896 | Sanderson ......................... | 210/532.1 |
| 717,106 | 12/1902 | Maranville et al. ................ | 210/519 |
| 3,707,404 | 12/1972 | Carlson ............................... | 210/513 |
| 4,035,302 | 7/1977 | Seo et al. ............................ | 210/513 |
| 4,039,458 | 8/1977 | Maisonneuve ...................... | 210/513 |
| 4,111,806 | 9/1978 | Wright et al. ....................... | 210/540 |
| 4,883,603 | 11/1989 | Roggenstein et al. ............ | 210/521 |
| 4,938,878 | 7/1990 | Hall ..................................... | 210/521 |

Primary Examiner—Christopher Upton
Attorney, Agent, or Firm—Henderson & Sturm

[57] ABSTRACT

A paint thinner recycling tower device (10) including a reservoir member (30) for collecting and separating contaminated paint thinner that is introduced into the lower portion of the reservoir member (30) by tube means (35) (43) which extend from a filler member (40); wherein the upper portion of the reservoir member (30) is provided with a flexible outlet hose (51) for draining the clarified paint thinner (83) from the upper portion of the reservoir member (30).

5 Claims, 2 Drawing Sheets

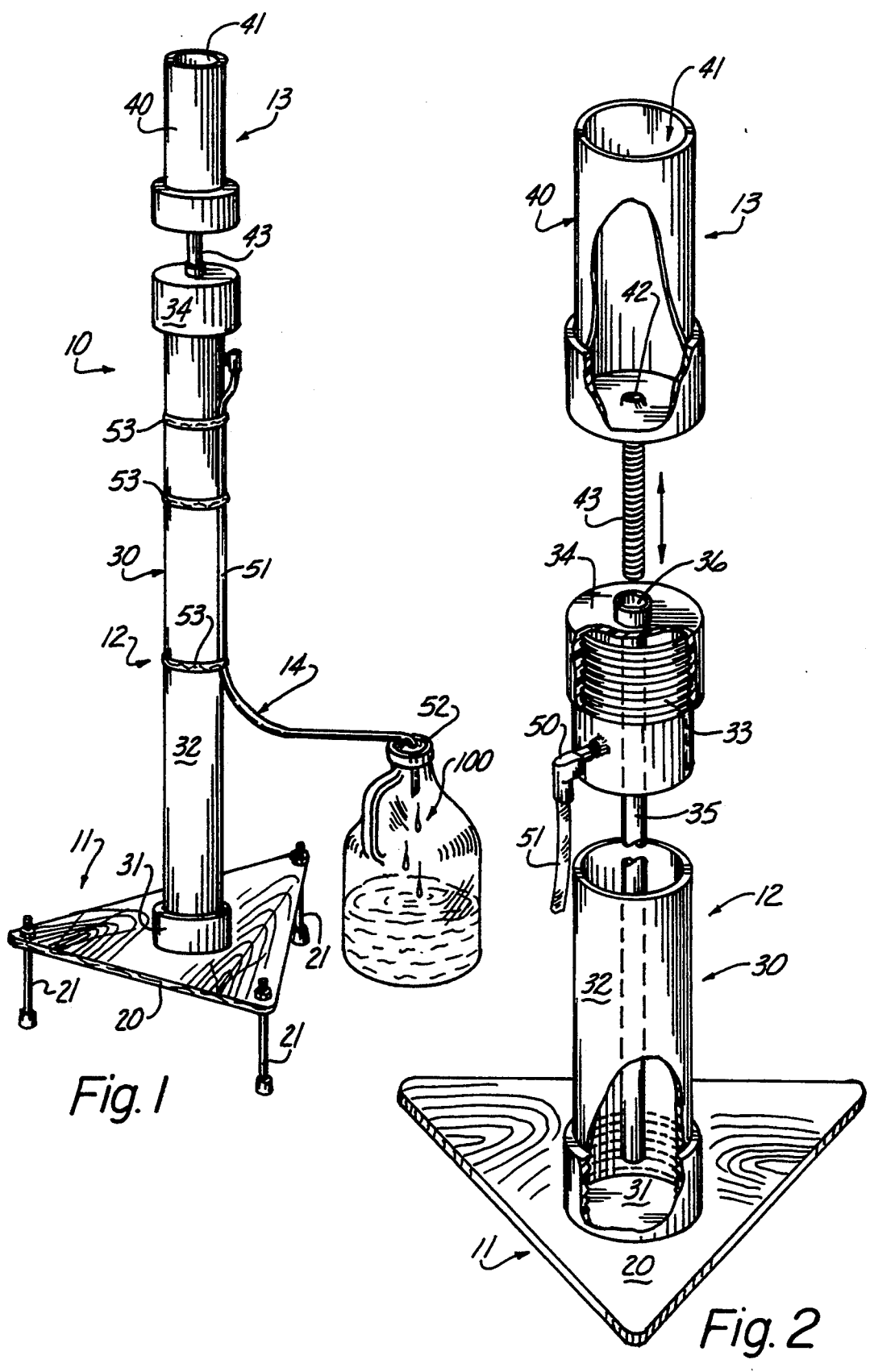

PAINT THINNER RECYCLING TOWER

TECHNICAL FIELD

The present invention relates to the field of recycling systems in general, and in particular to a novel device for recycling contaminated mineral spirits paint thinners.

BACKGROUND ART

This invention was the subject matter of Document Disclosure Program Registration No. 309,283; which was filed in the United States Patent and Trademark Office on May 5, 1992.

As can be seen by reference to the following U.S. Pat. Nos. 4,111,806; 4,035,302; 4,039,458; and 3,707,404; the prior art is replete with myriad and diverse separator devices.

While all of the aforementioned prior art constructions are more than adequate for the basic purpose and function for which they have been specifically designed, these devices do not embody the simplicity of construction and ease of operation that are inherent in the device that forms the basis of the present invention.

As most people are aware paint thinner is relatively inexpensive to purchase but due to environmental concerns very difficult and/or expensive to dispose of, or to recycle using conventional methods and apparatus.

As a consequence of the foregoing situation, there has existed a longstanding need among users of mineral spirits based paint thinners, for a relatively simple and economical device that can be employed to recycle used mineral spirits paint thinner at their source of origin; and, the provision of such a construction is a stated objective of the present invention.

DISCLOSURE OF THE INVENTION

Briefly stated, the paint thinner recycling tower device which forms the basis of the present invention comprises in general: a base unit, a reservoir unit; a filler unit; and, an outlet unit.

The reservoir unit is supported by the base unit and aligned with the filler unit. In addition, the filler unit cooperates with the reservoir unit to introduce a restricted flow of contaminated paint thinner into the lower portion of the reservoir unit.

The extreme difference between the diameter of the reservoir unit and its height, plus the point at which contaminated paint thinner is introduced into the unit, tend to accelerate the separation process within the unit. The rate at which contaminated paint thinner is introduced into the reservoir unit shall be no more than one fourth the total capacity of the reservoir unit per day to allow sufficient settling time within the lower portion of the reservoir unit, such that relatively clear paint thinner can be removed from the upper portion of the reservoir unit via the outlet unit to recycle the paint thinner.

BRIEF DESCRIPTION OF THE DRAWINGS

These and other attributes of the invention will become more clear upon a through study of the following description of the best mode for carrying out the invention, particularly when reviewed in conjunction with the drawings, wherein:

FIG. 1 is a perspective view of the paint thinner recycling tower device that forms the basis of the present invention;

FIG. 2 is an exploded perspective view of selected portions of the device; and,

BEST MODE FOR CARRYING OUT OF THE INVENTION

Figure 3:
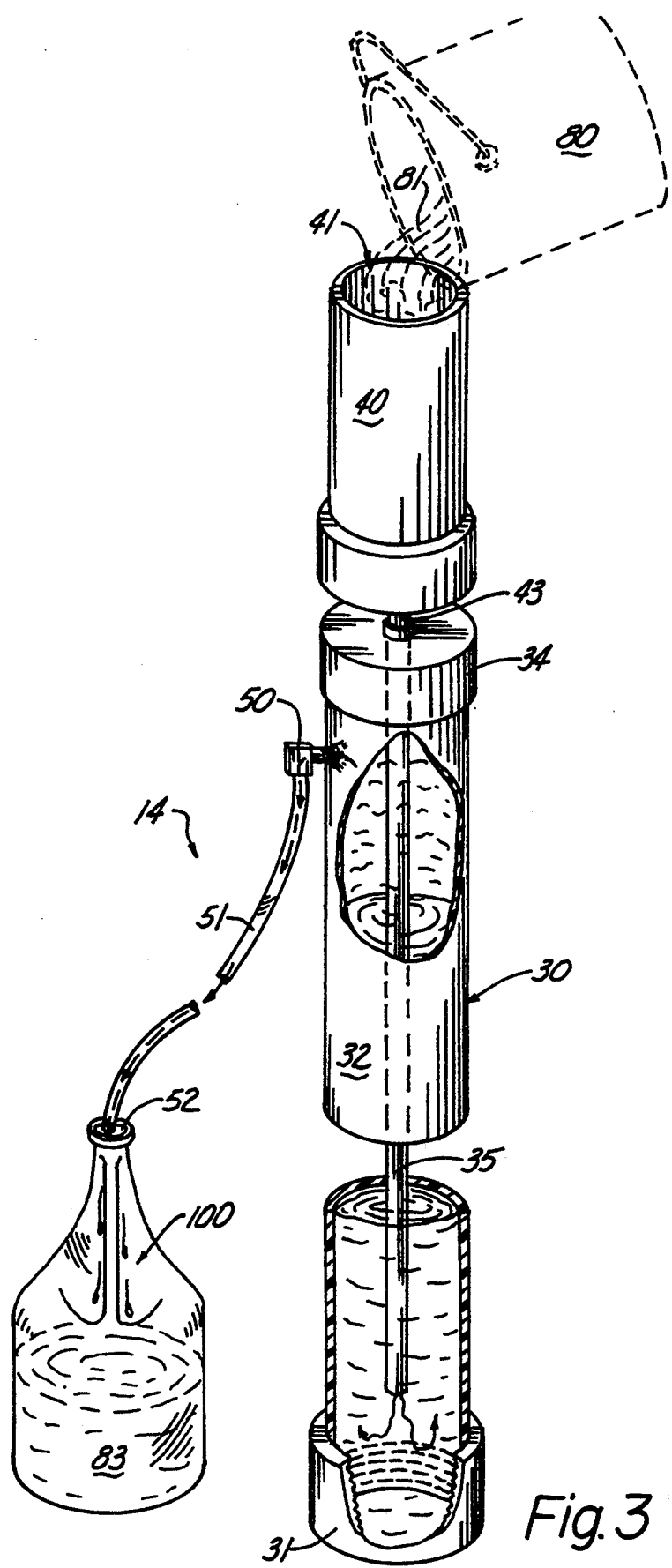
FIG. 3 is an enlarged detail view of the device in use.

As can be seen by reference to the drawings, and in particular to FIG. 1, the paint thinner recycling tower device that forms the basis of the present invention is designated generally by the reference numeral (10). The device (10) comprises in general: a base unit (11); a reservoir unit (12); a filler unit (13); and, an outlet unit (14). These units will now be described in seriatim fashion.

As can best be seen by reference to FIG. 1, in the preferred embodiment of this invention, the base unit (11) comprises an enlarged generally flat rigid base member (20) supported on a plurality of leg elements (21) which suspend the base member (20) in a horizontal disposition at a selected height above a level surface such as a floor, or the like.

As shown in FIGS. 1 through 3, the reservoir unit (12) comprises an elongated generally cylindrical reservoir member designated generally as (30) and including a sealed end inverted cap element (31) that is rigidly secured to the base member (20); a central elongated hollow cylindrical body element (32) whose lower end is threaded and operatively secured in the cap element (31), and whose upper end is threaded as at (33) to allow for disassembly and cleaning of reservoir unit (30).

As can best be seen by reference to FIG. 2, the reservoir member (30) also comprises an internally threaded upper cap element (34) having an elongated hollow inlet tube (35) which projects through the upper cap element (34) and extends a substantial distance into the interior of the reservoir body element (32) when the threaded cap element (34) is engaged with the threaded upper portion (33) of the reservoir body element.

Still referring to FIG. 2, it can be seen that the filler unit (13) comprises a generally cylindrical filler member designated generally as (40) having an enlarged opening (41) formed on its upper end and a relatively small opening (42) formed on its lower end; wherein, a reduced diameter filler tube (43) is sealingly secured in the smaller opening and depends downwardly from the lower end of the filler member (40); and, wherein the filler tube (43) is dimensioned to be received in the opening (36) of the inlet tube (35) in the upper cap element (34) of the reservoir.

As shown in FIGS. 1 through 3, the outlet unit (14) comprises an inverted generally L-shaped fluid coupling member (50) having one end in open fluid communication with the upper portion of the fluid reservoir body (32), and the other end operatively attached to an elongated small diameter flexible outlet hose (51) whose inside diameter is equal to the inside diameter of the filler tube (43); so that the rate of fluid entering the reservoir member (30) cannot exceed the rate of fluid passing through the outlet hose (51).

In addition, the lower end of the outlet hose (51) projects through a cap member (52) that is dimensioned to engage the mouth of a collection receptacle (100) that is employed to collect the recycled paint thinner.

As shown in FIG. 1, this invention also contemplates the use of releasable fastening elements (53) such as straps, rubber bands, or the like for releasably attaching portions of the outlet hose (51) to selective portions of the reservoir member (30) particularly during the separation phase of the recycling procedure.

As can best be seen by reference to FIGS. 1 and 3, contaminated paint thinner (81) is poured from a suitable container (80) into the filler member (40); whereupon, the contaminated thinner (81) passes through the filler tube (43) into the inlet tube (35) of the reservoir member (30); wherein, the contaminated thinner (81) is introduced into the lower portion of the reservoir member (30).

Once a given volume of contaminated thinner (81) has rested for a period of time within the reservoir member (30), the paint will separate out from the thinner and fall to the bottom of the reservoir member (30). Then as additional volumes of contaminated thinner (81) are introduced into the bottom of the reservoir member (30) the clarified thinner (83) will eventually reach the fluid coupling (50) and flow by gravity through the outlet hose (51) and into the collection receptacle (100).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A paint thinner recycling tower device for recycling mineral spirits based contaminated paint thinner; wherein, the device consists of:

an enlarged base unit;

a reduced diameter reservoir unit associated with said base unit wherein the reservoir unit includes a central elongated generally hollow cylindrical body element whose upper and lower ends are threaded, an internally threaded sealed end inverted cap element threadedly attached to the lower end of said body element and attached to said base unit and an internally threaded upper cap element attached to the upper end of said body element and having an elongated hollow inlet tube which projects through the upper cap element and extends a substantial distance into said body element;

a filler unit including a filler member having an upper end provided with an enlarged opening and a lower end provided with a relatively small opening;

a filler tube operatively associated with the relatively small opening in the filler unit and the inlet opening in the upper cap member of the reservoir member for introducing contaminated paint thinner at a predetermined location within the lower portion of the reservoir member; and, an outlet unit including a generally elongated flexible outlet hose having one end operatively connected to the upper portion of the reservoir member.

2. The device as in claim 1; wherein, at least a portion of said filler tube has an inside diameter that is the same as the inside diameter of said flexible outlet hose so that the rate of fluid entering the reservoir unit cannot exceed the rate of fluid passing through said outlet hose.

3. The device as in claim 1, further including at least one releasable fastening element for releasably attaching a portion of the outlet hose to the exterior surface of the reservoir unit.

4. The device as in claim 1; wherein, said base unit is further provided with a plurality of support legs.

5. The device as in claim 1; wherein, the other end of said outlet hose is provided with a cap member.

* * * * *